United States Patent Office 3,600,435
Patented Aug. 17, 1971

3,600,435
BIS ALIPHATIC PHOSPHONIC ACID ANHYDRIDES
David I. Randall and Clarence R. Stahl, Easton, Pa., assignors to GAF Corporation, New York, N.Y.
No Drawing. Filed Jan. 26, 1968, Ser. No. 700,743
Int. Cl. C07f 9/28, 9/38
U.S. Cl. 260—502.4P                1 Claim

ABSTRACT OF THE DISCLOSURE

Bis aliphatic phosphonic acid anhydrides represented by the formula:

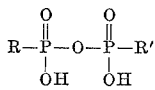

wherein R and R' represent an alkyl group, including halo alkyl groups, of 1 to 6 carbon atoms, and preferably a 2-haloalkyl group.

---

This invention relates to new and useful bis aliphatic phosphonic acid anhydrides and more particularly to bis 2-haloalkyl phosphonic acid anhydrides, and still more particularly to bis beta-chloroethylphosphonic acid anhydride.

The preparation of phosphonic acids is known in the art and in general the phosphonic acids are produced by the hydrolysis of a corresponding ester in the presence of a mineral acid. These processes, however, are not generally suitable for the commercial prodction of such acids, and in particular to the production of beta-chloroethylphosphonic acid. Thus, for example, Kosolopoff Organophosphorous Reactions (page 139) John Wiley & Sons (1950), discloses producing beta-chloroethylphosphonic acid by the hydrolysis of bis (2-chloroethyl) beta-chloroethylphosphonate. This process, however, requires a large excess of acid which must be neutralized and in addition produces toxic ethylene chlorohydrin as a by-product which is not completely removed even after evaporation of water, an evaporation which raises the cost of the process. Moreover, the hydrolysis reaction proceeds very slowly, requiring as much as three days to effect completion thereof.

In the copending application of David I. Randall, one of the present applicants, Ser. No. 628,839 filed Apr. 6, 1967, there is described an improved method for the production of aliphatic phosphonic acids by contacting an ester of an aliphatic phosphonic acid which is stable at a temperature of above about 140° C., and which is represented by the following general formula:

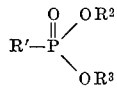

wherein R', R² and R³ are selected from the group consisting of alkyl and haloalkyl groups containing 1 to 6 carbon atoms, with an anhydrous halogen halide selected from the group consisting of hydrogen bromide and hydrogen chloride, at a temperature above about 140° C. and below the decomposition temperature of the ester.

We have now discovered that the product of said reaction contains, in addition to the expected aliphatic phosphonic acid, a substantial amount of new and useful bis aliphatic phosphonic acid anhydride, which may be recovered therefrom in high purity. These novel bis aliphatic phosphonic acid anhydrides may be hydrolyzed to the aliphatic phosphonic acid, and for many applications the mixture of aliphatic phosphonic acid and bis aliphatic phosphonic acid may be used as produced.

An object of this invention is to provide new and useful bis aliphatic phosphonic acid anhydrides.

Another object of this invention is to provide a process for producing such anhydrides in good yields at low cost.

A further object of this invention is to provide a new and useful bis beta-chloroethylphosphonic acid anhydride and mixtures thereof with beta-chloroethyl phosphonic acid.

These and other objects of the invention will be more apparent from reading the following detailed description thereof.

The present invention will be described with particular reference to bis beta-chloroethyl phosphonic acid anhydride and mixtures thereof with beta-chloroethyl phosphonic acid, since this anhydride is of particular interest as exerting hormonal effect in plants, and the novel compound bis-(chloroethanephosphonic acid) anhydride (CEPAA) alternatively named pyro(chloroethylphosphonic acid) hitherto has been unknown. The new compound behaves in similar fashion to chloroethane phosphonic acid on plants. We are not certain of the mechanism of the anhydride's action in plants, although presumably it acts as does chloroethane phosphonic acid, by releasing ethylene itself or through promotion of ethylene formation by enzymatic action.

The properties of pyro(chloroethylphosphonic acid) and chloroethyl phosphonic acid differ in a manner similar to those of orthophosphoric acid and pyrophosphoric acid in so far as the two systems can be compared. The pyro acid has a higher melting point, is a stronger acid and hydrolyzes in aqueous solution.

The hydrolysis of pyrochloroethyl phosphonic acid requires conditions similar to those necessary for the hydrolysis of pyrophosphoric acid. In dilute aqueous solution at room temperature the rate of hydrolysis is very slow. The pyro acid can be titrated in aqueous solution without the occurrence of detectable hydrolysis. In dilute aqueous solution (0.1% or less) complete hydrolysis requires 4 hours at steam bath temperature. Hydrolysis occurs more rapidly as the concentration is increased because of the increased hydrogen ion concentration. Fine crystals of pyro (chloroethylphosphonic acid) exposed to the atmosphere absorb water and rapidly hydrolyze to chloroethyl phosphonic acid. Neutralized solutions of the pyro acid are quite stable.

Although both chloroethyl phosphonic acid and pyro (chloroethylphosphonic acid) contain two acid functions, the potentiometric titration curves of the two compounds differ greatly. Two inflections between pH 4 and 5.8 and between pH 8.6 and 10 occur in the titration of an aqueous solution of chloroethyl phosphonic acid with dilute sodium hydroxide. The titration curve of pyro(chloroethylphosphonic acid) obtained in the same manner shows only one inflection between pH 4.5 and 9.5. The two acid functions on the pyro acid cannot be differentiated and the base consumed at the endpoint of the titration is equivalent to the total acid present. The ionization constant calculated from the titration curve for the pyro acid is $7.6 \times 10^{-3}$. The calculated constants for chloroethyl phosphonic acid are $3.2 \times 10^{-3}$ and $8.0 \times 10^{-8}$.

Another important chemical difference between the two compounds lies in their action with warm excess base. The evolution of ethylene at 70° C. in excess aqueous base from pure chloroethane phosphonic acid is quantitative, while, under the same conditions, CEPAA releases no ethylene. The new compound is much less soluble in anhydrous ether than is chloroethane phosphonic acid. Highly purified CEPAA, washed with anhydrous ether several times, melts at 96.5–98.5° C. It is a white hygroscopic solid.

While the novel bis aliphatic phosphonic acid anhydrides (or pyroaliphatic phosphonic acid) of the present invention may be produced by the use of straight dehydration techniques on the corresponding aliphatic phosphonic acid, we prefer to employ the process disclosed in the above-mentioned copending application Ser. No. 628,839 filed Apr. 6, 1967, now abandoned of David I. Randall, i.e. the passage of anhydrous HCl (or HBr) gas through a bis-aliphatic ester of an aliphatic phosphonic acid. Although there are several methods possible for the formation of the anhydride, the most reasonable one appears to be the cleavage of the bis ester of the aliphatic phosphonic acid to the aliphatic phosphonic acid and the dehydration of the acid to the anhydride in the presence of the hot HCl gas, as represented by the following equations

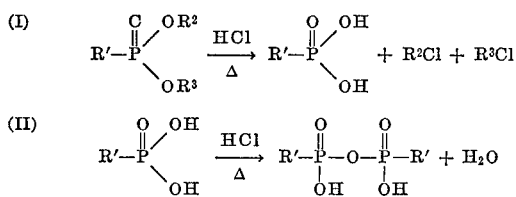

We do not, however, wish to be held to any theory of operation.

Without HCl at elevated temperatures, a very impure anhydride occurs. In the case of bis(2-chloroethyl) beta-chloroethyl, the impurities introduced are due to dehydrohalogenation of chloroethane phosphonic acid or CEPAA itself to yield unsaturated compounds. The use of HCl obviously represses the dehydrohalogenation reaction in the direction of the desired CEPAA.

The esters which may be cleaved and dehydrated on our preferred process of producing the novel bis aliphatic phosphonic acids of this invention are represented by the following structural formula:

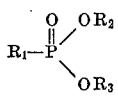

wherein $R_1$, $R_2$ and $R_3$ are either an alkyl group or a haloalkyl group, preferably a 2-haloalkyl group, not containing more than six carbon atoms wherein the halo group is either fluoro, chloro, bromo or iodo; and $R_1$, $R_2$ and $R_3$ may be the same or different groups, and preferably are the same group.

The hereinabove mentioned esters having identical $R_1$, $R_2$ and $R_3$ groups may be produced, for example, by the isomerization of the corresponding phosphite. Thus, a tris (2-chloroalkyl) phosphite, such as tris (2-chloroethyl) phosphite may be heated in the absence of a diluent to effect isomerization thereof to bis (2-chloroethyl) beta-chloroethylphosphonate, as taught by Kabachnik, "Bull. acid. sci. U.R.S.S. classe sci. chim.," 1946, 403 [C.A. 42 7242 (1948)] also reported in Organic Reactions vol VI, pages 287–8, all hereby incorporated by reference. This reaction, however, is violently exothermic (almost explosive) and very dangerous on a large scale. Consequently, it is preferred to effect the isomerization in the presence of an inert organic diluent, such as o-dichlorobenzene, cumene, xylene, and the like, at an elevated temperature, for example about 160° C. The organic diluent moderates the isomerization sufficiently to enable large scale production of the phosphonate ester. The isomerization reaction in the presence of a diluent is further described in German Pat. 964,046 of Mar. 16, 1957 and by Gefter C. A. 53 1120a, Zhur. Obschchei Khim. 28 1908 (1958), both hereby incorporated by reference. Similarly, the tris (alkyl) phosphites may be isomerized to the bis (alkyl) alkylphosphonates.

As representative examples of esters which may be cleaved in accordance with the process of the invention, there may be mentioned: bis (2-chloroethyl) beta-chloroethylphosphonate; bis (2-chloropropyl) beta-chloropropylphosphonate; dimethyl methylphosphonate; diethyl ethylphosphonate; di-isopropyl isopropylphosphonate; di-n-hexyl n-hexylphosphonate; and the like. It is to be understood, however, that the hereinabove mentioned esters are only illustrative of the esters which may be cleaved in accordance with the process of the invention and the scope of the invention is not to be limited thereby.

The invention will be further described with reference to the following examples. It is to be understood that the examples are illustrative of the invention and the scope of the invention is not to be limited thereby.

EXAMPLE I 1938 grams of crude bis (2-chloroethyl) beta-chloroethylphosphonate, prepared by the rearrangement of tris (2-chloroethyl) phosphite in o-dichlorobenzene, were introduced into a 3 liter 3 neck flask, equipped with stirrer, glass inlet tube and a Y tube, containing a thermometer which extended below the liquid surface. The other arm of the Y tube was attached to a down dropping bulb condenser attached to a one liter one neck distillation flask, containing a side arm which was connected to a cascade water scrubbing tower for removal of excess hydrogen chloride. The crude ester was heated, with stirring, to a temperature of 171° C., at which temperature hydrogen chloride from a pressure cylinder was introduced beneath the surface of the liquid, resulting in vigorous evolution of 1,2-dichloroethane. The addition of hydrogen chloride was continued for 6.5 hours while maintaining a temperature of 175° C. the evolution of 1,2-dichloroethane was very rapid during the first four hours. After the addition of hydrogen chloride was terminated, nitrogen was bubbled through the reaction mixture at a temperature of 170° C. to remove hydrogen chloride therefrom. The resulting product weighed 1039 grams and had a melting point of 35–55° C.

This product, on analysis, was found to consist of about 30% (by weight) of bis (chloroethane phosphonic acid) anhydride, and 70% (by weight) of beta-chloroethane phosphonic acid. The anhydride is separated from the acid by stirring 1 part of the mixture in 20 parts cold anhydrous ethyl ether. The anhydride is essentially insoluble and is recovered by filtration. Several washings of the filter cake with anhydrous ether raises its M.P. to 96.5–98.5° C.

EXAMPLE II 50 g. beta-chloroethane phosphonic acid are stirred with 10.4 g. thionyl chloride at 90° C. After 1 hour the copious evolution of $SO_2$ and ClH close. The residual gas is removed under vacuum. The clear viscous syrup contains 40% (by weight) bis (chloroethane phosphonic acid) anhydride on analysis. The remainder of the product is unchanged beta-chloroethane acid.

The anhydride was separated from the acid in the same manner as Example I, by stirring 1 part of the mixture with 20 parts cold anhydrous ethyl ether. The insoluble anhydride, which precipitated, was recovered by filtration and dried.

EXAMPLE III

Using the procedure described in Example I, 1,000 g. of bis(2-chloropropyl) beta-chloropropyl phosphonate were cleaved with anhydrous hydrogen chloride to produce 525 g. of a mixture of beta-chloropropylphosphonic acid and bis(beta-chloropropylphosphonic acid) anhydried. 1,2-dichloropropane was recovered as a byproduct.

The bis(beta-chloroethanephosphonic acid) anhydride of the present invention is particularly valuable for use as a plant growth regulator by application to plants, either alone or in admixture with the beta-chloroethylphosphonic acid, in essentially any proportions, i.e. in relative proportions of the anhydride to acid of from 1:99 to 99:1, although as a practical matter, it is preferred to employ such mixtures in the ratio of 1:9 to 9:1 by weight.

The effect of the bis(beta-chloroethanephosphonic acid) anhydride on living plants and its manner of use thereon, is essentially the same as that of the beta-chloroethanephosphonic acid. This effect and use is more fully described in copending application Ser. No. 617,860 filed Feb. 23, 1967 by Charles D. Fritz and Wilbur F. Evans, entitled "Growth Regulator Process Utilizing Phosphonic Compounds," and the application of Anson R. Cooke, Ser. No. 659,310, filed Aug. 9, 1967, and entitled, "Method of Initiating Flowering," both now abandoned, and the disclosure of said copending applications are, therefore, incorporated in the present application by reference.

We claim:
1. Bis(2-chloroethanephosphonic acid) anhydride of the formula:

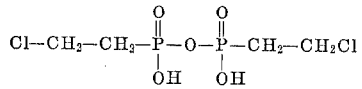

References Cited

UNITED STATES PATENTS

| | | | |
|---|---|---|---|
| 2,787,629 | 4/1957 | Coover et al. | 260—461 |
| 2,882,305 | 4/1959 | Copenhaver et al. | 260—543 |
| 3,223,514 | 12/1965 | Gradsten | 260—502.4X |

OTHER REFERENCES

Burger et al., J. Am. Chem. Soc. 79, 3575 (1957).

LEWIS GOTTS, Primary Examiner

R. GERSTL, Assistant Examiner

U.S. Cl. X.R.

71—86; 260—961

PO-1050
(5/69)

UNITED STATES PATENT OFFICE
CERTIFICATE OF CORRECTION

Patent No. 3,600,435     Dated January 26, 1968

Inventor(s) David I. Randall and Clarence R. Stahl

It is certified that error appears in the above-identified patent and that said Letters Patent are hereby corrected as shown below:

Column 2, line 4, after "acid" please insert --anhydride--.

Signed and sealed this 5th day of November 1974.

(SEAL)
Attest:

McCOY M. GIBSON JR.            C. MARSHALL DANN
Attesting Officer              Commissioner of Patents